United States Patent [19]

Tackles et al.

[11] Patent Number: 4,830,240
[45] Date of Patent: May 16, 1989

[54] WATER BOTTLE CAGE AND METHOD

[75] Inventors: George J. Tackles, Ketchum, Id.; Michael W. Sinyard, San Jose, Calif.

[73] Assignee: Specialized Bicycle Components, Inc., Morgan Hill, Calif.

[21] Appl. No.: 889,794

[22] Filed: Jul. 24, 1986

[51] Int. Cl.[4] .............................................. B62J 11/00
[52] U.S. Cl. .................................. 224/35; 224/32 R; 224/37; 224/38
[58] Field of Search ................. 224/148, 35, 39, 32 R, 224/41, 30 A, 36; 220/85 H, 239; 248/214, 218.4

[56] References Cited

U.S. PATENT DOCUMENTS

| | | | |
|---|---|---|---|
| 3,672,547 | 6/1972 | Kozlowski | 220/293 X |
| 3,945,544 | 3/1976 | Walker et al. | 224/32 R |
| 4,009,810 | 3/1977 | Shook | 224/39 |
| 4,334,642 | 6/1982 | Reisch | 224/37 |
| 4,345,704 | 8/1982 | Boughton | 224/148 X |
| 4,366,922 | 1/1983 | Levine et al. | 224/32 R |
| 4,386,721 | 6/1983 | Shimano | 224/39 |
| 4,437,596 | 3/1984 | Shook | 224/39 |
| 4,441,638 | 4/1984 | Shimano | 224/35 |
| 4,570,835 | 2/1986 | Criqui et al. | 224/148 X |
| 4,640,449 | 2/1987 | Blackburn | 224/41 |

Primary Examiner—Henry J. Recla
Assistant Examiner—Robert Fetsuga
Attorney, Agent, or Firm—Hohbach, Test, Albritton & Herbert Flehr

[57] ABSTRACT

A water bottle cage comprising two mating sections formed of injection molded plastic, is disclosed. The two sections define a bayonet snap assembly which maintains alignment of the two sections, permits easy pivotal joining and release of the two sections, and locks the two sections upon insertion of a water bottle. Alternatively, the two sections can be permanently joined, for example, by ultrasonic bonding.

9 Claims, 3 Drawing Sheets

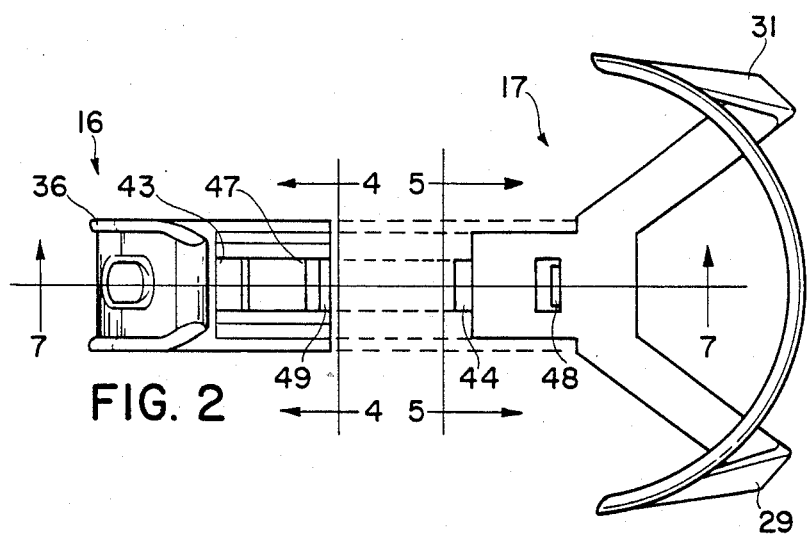
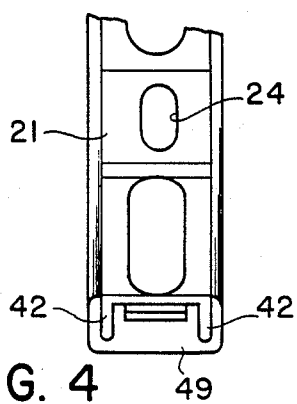
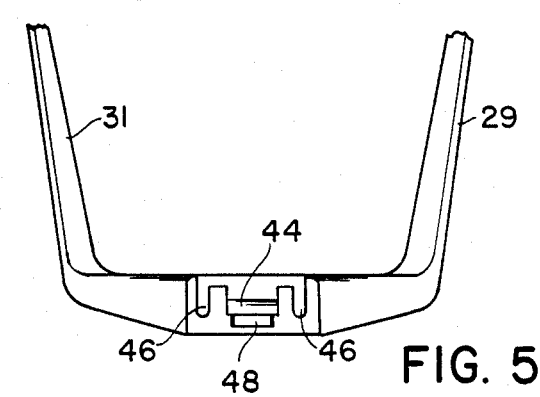
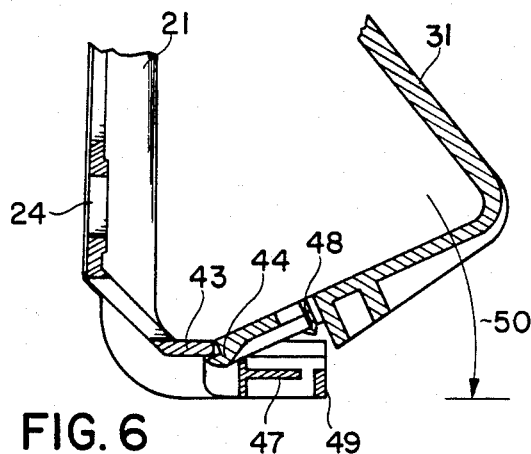
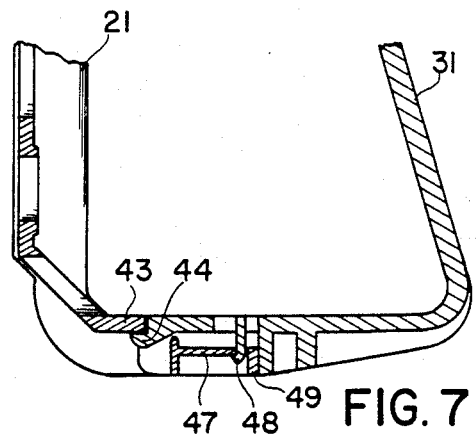

WATER BOTTLE CAGE AND METHOD

BACKGROUND OF THE INVENTION

The present invention relates to water bottle cages for bicycles and other vehicles and, in particular, to a plastic water bottle cage.

Conventional water bottle cages are made of metal and, thus, are typically relatively heavy. To decrease weight, such cages are formed as skeleton-like structures which can be relatively intricate and difficult and expensive to fabricate. Forming such a cage involves drawing and bending the metal into various curves and angles to form the skeleton-like structure, then joining the structure to a relatively flat mounting bracket which is used for attachment to the bicycle frame.

Recently, in attempts to decrease the weight of such water bottle cages further, relatively lightweight metals such as aluminum have been used in their construction. Notwithstanding these efforts, conventional water bottle cages are still relatively heavy as well as intricate.

In view of the above discussion, it is desirable to have, and it is an object of the present invention to provide, a lightweight water bottle cage which i also easy to manufacture.

It is a related object of the present invention to provide a water bottle cage which is lightweight, easy to manufacture and suitable for high volume, low cost production.

SUMMARY OF THE INVENTION

The above and other objects are achieved in a working embodiment of my water bottle cage which comprises two lightweight, flexible high strength sections that are interlocked by a separable bayonet latch or snap assembly. The bayonet snap assembly is specifically designed to permit ease of joining and separation of the two cage parts when a water bottle is not positioned within the cage. When a bottle is in the cage, the bottle securely locks the bayonet latch assembly. Preferably, the cage is formed of lightweight, high strength material such as fiber-reinforced polymer which is readily formed into the two-part cage using techniques such as injection molding.

Alternatively, the two cage sections can be joined permanently, for example, by ultrasonic welding.

BRIEF DESCRIPTION OF THE DRAWINGS

The above and other aspects of the present invention are described with respect to the drawings, in which:

FIG. 2 is an exploded top plan view of my water bottle cage shown in FIG. 1;

FIGS. 4 and 5 are partial, cross-sectional views taken, respectively, along lines 4—4 and 5—5 in FIG. 2;

FIG. 6 is a partial, vertical section through (and depicting the method of joining the two constituent members of) my water bottle cage;

FIG. 7 is a partial, vertical section view, similar to FIG. 6, of the assembled water bottle cage of FIG. 2.

DETAILED DESCRIPTION OF THE INVENTION

Figure 3:
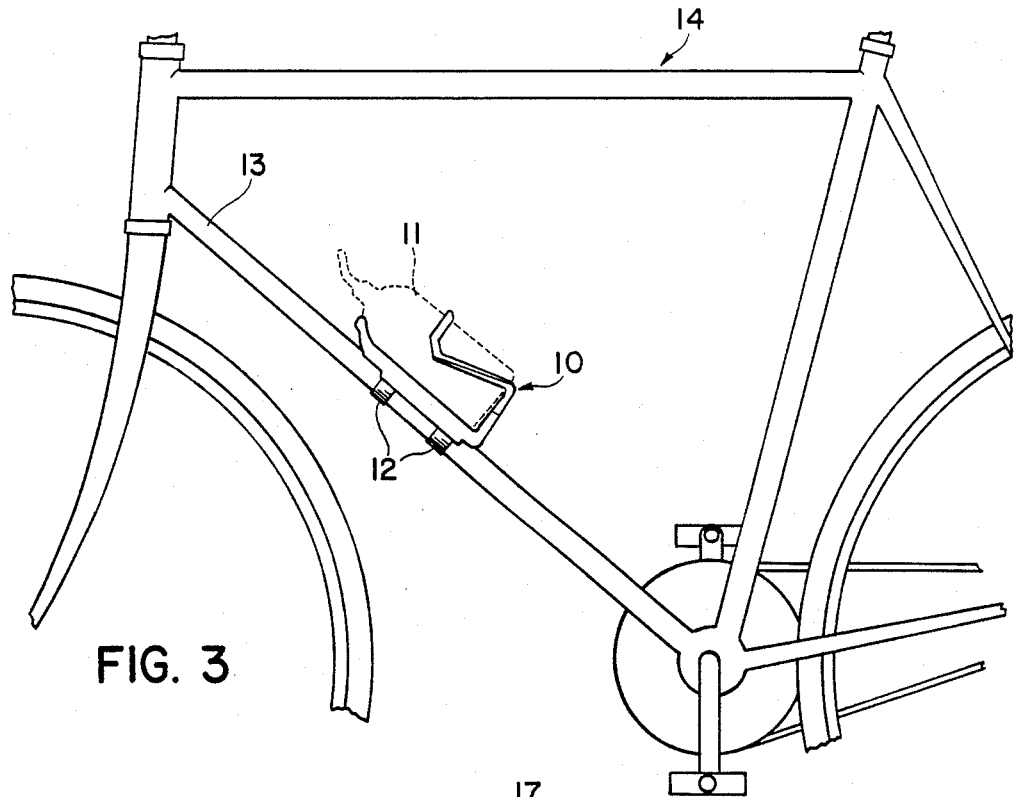
FIG. 3 depicts the mounting of my water bottle cage to a bicycle.

FIG. 3 illustrates the use of a presently preferred embodiment 10 of my water bottle cage to mount a water bottle, shown in phantom at 11, to the frame 13 of a bicycle 14. Typically, the cage 10 is attached to the bicycle frame 11 by mounting means such as clamps or straps 12. Alteratively, the cage 10 can be attached directly to the bicycle by screws.

Figure 1:
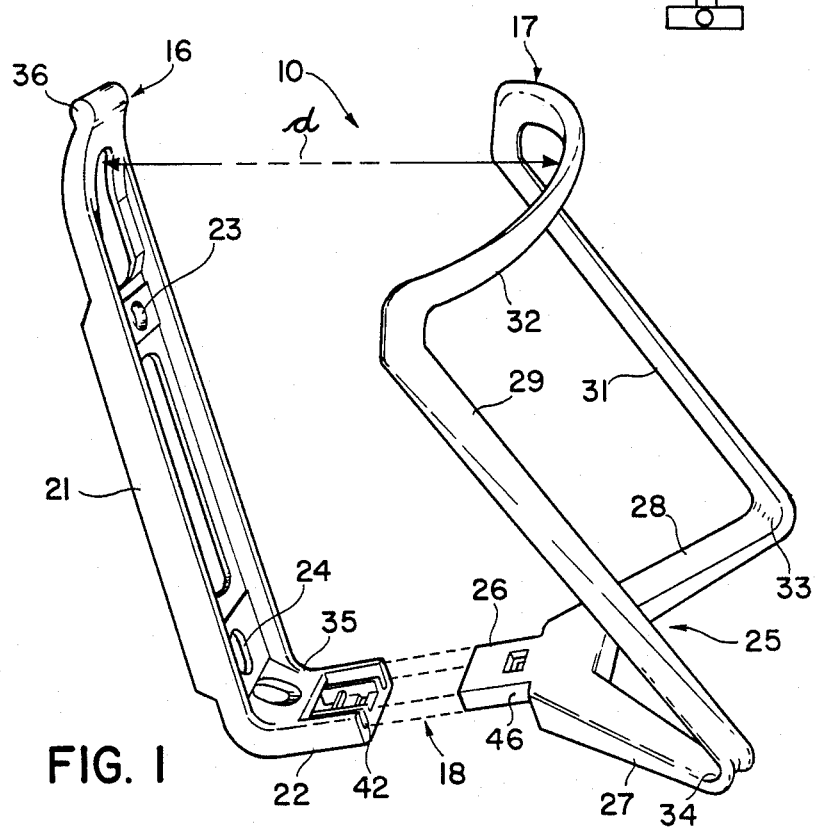
FIG. 1 is an exploded perspective view of a presently preferred embodiment of my water bottle cage.

As shown in FIG. 1, the cage 10 comprises two sections 16 and 17 which are joined by a bayonet snap or latch assembly 18. The use of the bayonet snap assembly 18 permits the cage to be formed in two sections which are releasably joined, while the use of two sections allows the cage to be formed of high strength, low weight material such as carbon fiber-reinforced polymer which, in turn, is readily formed using injection molding.

Rear section 16 of the cage 10 is a generally L-shaped member which includes rear upright 21 and base member 22. The rear upright 21 is also a mounting bracket and typically is about one-half to three-quarters of an inch wide to fit securely against a bicycle frame tube such as 13, FIG. 1. The upright 21 includes a hole 23 and a vertically elongated slot 24 for providing adjustable attachment to the clamps 12, FIG. 1, or directly to the bicycle frame tube 13, using screws (not shown). The front section 17 of the cage 10 includes a generally bifurcated Y-shaped base 25 which comprises member 26 and bifurcated angled members 27 and 28, which extend generally horizontally forward then bend rearward and upward into uprights 29 and 31, which are angled forward at the top into a generally horizontally-extending forwardly concave cross-member 32.

The rear upright 21, base members 22, 26, 27 and 28, uprights 29 and 31 and concave member 32 cooperate to resiliently yet securely engage the water bottle 11. Specifically, the configuration of the cage conforms to the outline and, generally, to the size of the bottle such as 11 with the exception that, preferably, when the cage is assembled, the distance, d, between the concave member 32 and the rear upright 21 is slightly less than the corresponding diameter of the bottle 11. As mentioned, the cage is formed of slightly resilient material. As a result of the slight flexure of the material which comprises the water bottle cage, and the flexure at bends 33 and 34 in the front uprights as well as that at the bend 35 in the rear upright, the uprights are readily moved apart to facilitate insertion of a bottle 11 into the cage, and resiliently apply compressive force to securely retain the inserted bottle against accidental removal. Also and as is best illustrated in FIG. 3, the upper section 36 of the rear upright 2 is oriented at a small forward angle relative to the lower body of the rear upright to provide a snug, secure fit against the shoulder of the water bottle.

Bayonet Snap Assembly 18

The construction of the bayonet snap or latch assembly 18 is illustrated in FIGS. 1 and 4–7. Referring initially to FIGS. 1, 4 and 5, the rear base member 22 includes a pair of longitudinally-extending grooves 42—42 and the front base member 25 includes a pair of mating, longitudinally-extending ribs 46—46 which fit within the grooves 42—42 to align the front section 17 relative to the rear section 16. The ribs 46—46 are of sufficient size to provide a slight friction fit within the grooves 42—42.

Referring now to FIGS. 6 and 7, bayonet snap assembly 18 also includes a pair of latches 44 and 48, both of which are part of front base section 26. A first, horizontally-extending latch 44 abuts lip 43 of the rear base section 22 and serves two functions. First, it provides a pivot support against lip 43 to permit pivotal insertion of the front cage section 17 into the rear section 16, as indicated by arrow 50, FIG. 6. Secondly, in abutting against lip 43, the latch 44 prevents rearward movement of the front cage section relative to the rear cage section.

The second latch 48 extends vertically, is flexible, and also serves two functions. First, the latch 48 is pivoted out of the way by mating lip 47 during insertion of the front cage section 17 and then snaps into place against the lip to hold the front section within the rear section and prevent accidental release. Secondly, the inserted latch 48 abuts against a transverse rib 49 of the rear section 16 and thereby prevents forward movement of the front cage section 17 away from the rear cage section 16. As mentioned above, insertion of the bottle 11 (FIG. 3) into the assemblied cage 10 spreads apart the forward and rear cage sections at the top thereof. The resulting compressive fit of the bottle 11 within the cage 10 securely retains the bottle within the cage. In turn, the bottle prevents the front section 17 from pivoting relative to rear section 16 and thus securely locks the front section to the rear section. When a bottle is not present in the cage, the front section 17 can be intentionally removed, easily, by pivoting the front section upwardly in the reverse direction of arrow 50, FIG. 6.

In summary, the resilient cage structure, the two latch mechanisms and the mating ribs and slots cooperatively function to permit ready pivotal joining and separation of the two cage sections, to securely hold the joined sections together, and to lock the two cage sections together when a bottle is in place. Because of the construction of the bayonet snap assembly 18, the two cage sections cannot be pulled apart or forced apart horizontally or vertically. Separation requires that the front section be pivoted upward relative to the rear section, thereby precluding separation when a bottle is in the cage and minimizing the possibility of inadvertent separation at other times.

Figure 8:
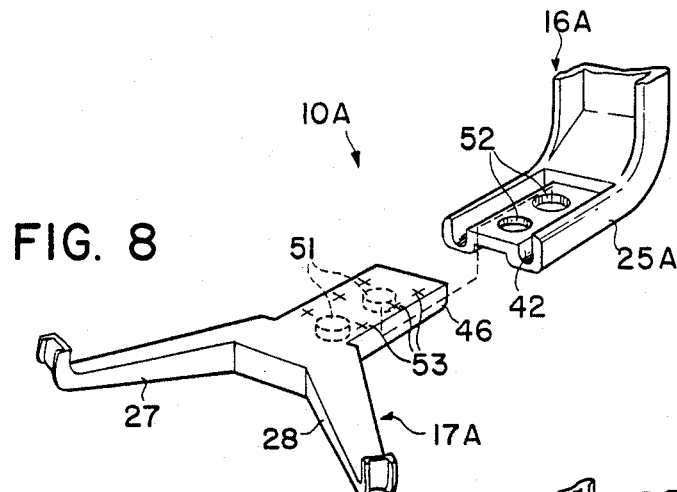
FIGS. 8–10 depict alternative embodiments of the water bottle cage of FIG. 1.

FIG. 8 depicts an alternative embodiment 10A of my water bottle cage in which the front and rear sections 16A and 17A are permanently joined. (In FIGS. 8, 9 add 10, components which are altered from the construction of FIGS. 1 through 7 are designated by a letter suffix such as 16A and 17A.) In this permanently joined embodiment 10A, the mating grooves 42 and ribs 46 are retained in the base but the two latch mechanisms are replaced by a pair of downward extending pegs 51 formed in the base of rear section 17A and mating receiving holes 52 formed in the base 25A of the front section 16A. The front and rear sections are oriented and easily and precisely assembled using the mating grooves 42 and ribs 46 and the mating pegs 51 and holes 52. The assembled polymer sections 16A and 17A can then be permanently joined, for example, by applying an ultrasonic bonding tool at locations such as 53—53.

Figure 9:
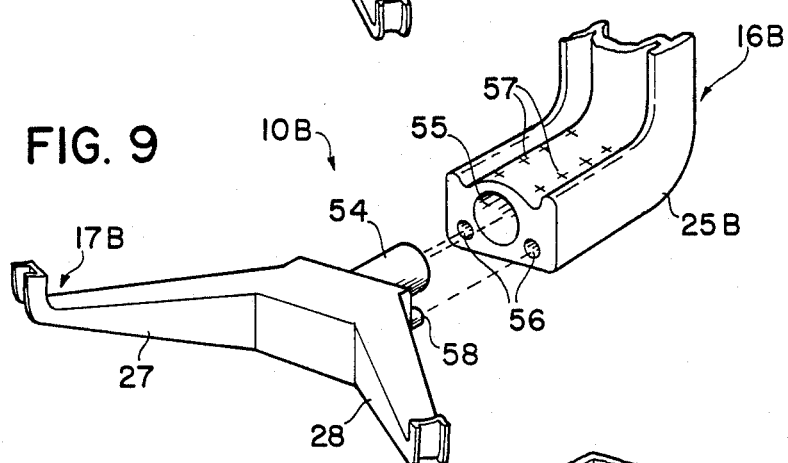

FIG. 9 discloses another, permanently joined alternative embodiment 10B of my water bottle cage. Here, base 25B of the front cage section 16B has a longitudinal hole 55 which is flanked by a pair of smaller longitudinal holes 56. The base of rear section 17B comprises mating, longitudinal peg 54 and smaller pegs 5.. The large peg 54 provides the main support while the smaller pegs 58 provide accurate, automatic alignment of the rear section 17B relative to the front section 16B. The automatically aligned, assembled front and rear sections can be permanently joined by ultrasonic bonding, for example, by applying an ultrasonic bonding tool at locations such as 57—57.

Figure 10:
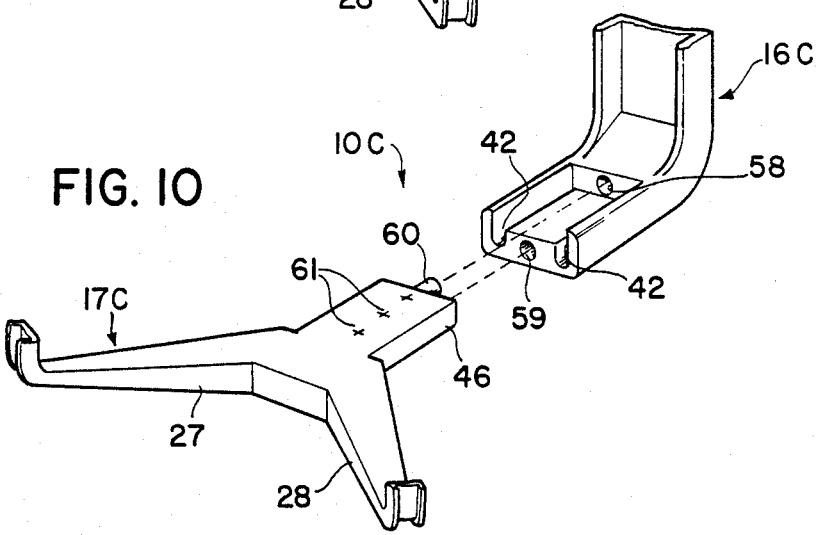

FIG. 10 disclose still another permanently joined embodiment 10C of my water bottle cage. Here, the base grooves 42 and ribs 46 are retained and are used in conjunction with a pair of mating longitudinal extending pegs (only one peg, 60, is shown) and mating holes 58 and 59, the mating pegs and holes provide automatic alignment and support for the assembled front and rear sections 16C and 17C. Again, ultrasonic bonding can be used to permanently join the assembled, polymer front and rear sections, for example, by applying an ultrasonic bonding tool at locations such as 61—61.

Other embodiments and variations will be readily derived by those of usual skill in the art such as, for example, the use of various numbers and configurations of mating pegs and holes and the use of rivets instead of pegs.

The above-described bicycle bottle cage 10 has been readily molded using standard injection molding technology, a two-part mold for the front cage section 17 and the rear section 16, and carbon fiber reinforced polymer material. A presently preferred material is lexan polycarbonate, specifically 30 percent GF polycarbonate. Those of usual skill in the art will appreciate that while this carbon fiber-containing polymer material is a presently preferred material, other materials or compounds which have the desired characteristics of flexibility and moldability, and which retain form and strength in hot weather and do not become brittle in cold weather are also suitable for this application. In addition to lexan polycarbonate polymer, other suitable polymer materials include merlon polycarbonate; polyamide, for example, nylon zytel, rilsan or ultramid;; acetel, for example, delrin or ultraform; polyester; and polysulfone. In addition, optional reinforcement fibers for the polymer material include in addition to carbon, graphite; aromatic polyimide; and glass.

In view of the preferred and alternative embodiments of my invention which is described her,, it will be appreciated that the scope of the invention is limited solely by the claims and that those of skill in the art will develop other modifications and embodiments based upon the descriptions here which are encompassed within the claims.

What is claimed:

1. A water bottle cage comprising:
   a generally L-shaped support section comprising first leg means and first base means and a generally L-shaped mating cage section comprising second leg means and second base means, the support section and the cage section being formed of flexible plastic material;
   said first and second base means each including a surface oriented and configured for mating against the corresponding surface of the other base means, said first and second base means further including cooperating mating joining means comprising at least one peg formed in at least one of the support section and the cage section and a mating hole formed in the other of the support section and the cage section for aligning and assembling the support section and the cage section with said surfaces mating against one another; and said first and second base means being joined at said surfaces.

2. A water bottle cage comprising:
a generally L-shaped support section comprising first leg means and first base means and a generally L-shaped mating cage section comprising second leg means and second base means, the support section and the cage section being formed of flexible plastic material;

said first and second base means each including a surface oriented and configured for mating against the corresponding surface of the other base means, said first and second base means further including cooperating mating joining means comprising at least one peg and one mating hole formed in separate ones of the support section and the cage section and at least one rib and one mating groove formed in separate ones of the support section and the cage section, for automatically aligning and assembling the support section and the cage section; and said first and second base means being joined at said surfaces.

3. A water bottle cage comprising:
a generally L-shaped support section comprising first leg means and first base means and a generally L-shaped gating cage section comprising second leg means and second base means, the support section and the cage section being formed of flexible plastic material;

said second leg means comprising a pair of spaced legs for cooperating with the first leg means to hold a bottle therebetween;

said first and second base means each including a surface oriented and configured for mating against the corresponding surface of the other base means, said first and second base means further including cooperating mating joining means for aligning and assembling the support section and the cage section with said surfaces mating against one another;

said first and second base means being joined at said surfaces; and wherein the cage material is selected from polymer material and fiber reinforced polymer material.

4. A water bottle cage comprising:
(a) generally L-shaped plastic support section comprising a leg and a base connected to said leg, the base itself comprising first and second spaced generally transverse, horizontal flanges and a pair of generally horizontal longitudinal grooves;

(b) a generally L-shaped plastic cage section comprising a pair of spaced legs; a concave member extending between the legs proximate the top thereof; and a horizontal base member connected between the legs at the bottom thereof; the base member further comprising a first generally horizontal longitudinal latch adapted for mating with the first flange for permitting pivotal insertion of the cage section into the support section and for restraining relative horizontal movement between the support section and the cage section along a first longitudinal horizontal direction, and a second generally vertical resilient latch adapted for mating with the second flange for releasably joining the support section and the cage section;

(c) the base further including transverse rib means positioned for abutting the second latch upon the insertion of the cage section into the support section for restraining relative horizontal movement of the cage and support sections along a second horizontal direction opposite to the first direction; and the base and base member comprising mating longitudinal rib means and groove means for aligning the support and cage sections;

(e) whereby insertion of a bottle into the water bottle cage prevents relative pivotal movement of the cage section and the support section, thereby locking said sections together.

5. The water bottle cage of claim 4 wherein the cage material is selected from the group consisting of polymer material and fiber-reinforced polymer materials.

6. The water bottle cage of claim 4 wherein the cage material is injection molded carbon fiber-containing polycarbonate material.

7. A water bottle cage comprising:
a plastic, generally L-shaped support section comprising a leg and a first base;

a plastic, generally L-shaped cage section comprising a pair of legs, and a second base connected between the legs at one nd thereof and a generally concave member connected to the legs proximate the opposite end thereof;

said bases each having a surface oriented and configured for mating against the corresponding surface of the other base;

joining means comprising at least one peg and one mating hole formed in the separate ones of said first and second bases in said mating surfaces thereof; and, further, said first and second mating bases being joined along said mating surfaces.

8. The water bottle cage of claim 7, said first and second bases further including at least one rib and one mating groove formed in separate ones of the mating surfaces thereof, for aligning said first and second bases and associated support and cage sections one to the other.

9. A water bottle cage comprising:
a first generally L-shaped support section comprising a leg and a first base;

a second generally L-shaped cage section comprising a pair of legs, and a second base connected between the pair of legs at one end thereof and a generally concave member connected to the legs proximate the opposite end thereof;

said bases each having a surface oriented and configured for mating against the corresponding surface of the other bases;

joining means comprising at least one peg and one mating hole formed in the separate ones of the first and second bases in said mating surfaces thereof; and, further, the first and second mating bases being joined along said mating surfaces.

* * * * *

UNITED STATES PATENT AND TRADEMARK OFFICE
CERTIFICATE OF CORRECTION

PATENT NO. : 4,830,240

DATED : May 16, 1989

INVENTOR(S) : George J. Tackles & Michael W. Sinyard

It is certified that error appears in the above—identified patent and that said Letters Patent is hereby corrected as shown below:

In Col. 1, line 25, change "i" to --is--;

In Col. 2, line 55, change "2" to --21--;

In Col. 3, line 50, change "add" to --and--;

In Col. 4, line 9, change "disclose" to --discloses--;

In Col. 4, line 40, change "ultramid" to --ultramide--;

In Col. 5, line 48, after "(a)", insert --a--; and

In Col. 6, line 29, change "nd" to --end--.

Signed and Sealed this

Fourth Day of September, 1990

*Attest:*

HARRY F. MANBECK, JR.

*Attesting Officer*  *Commissioner of Patents and Trademarks*